US012613512B2

(12) United States Patent
Koizumi et al.

(10) Patent No.: US 12,613,512 B2
(45) Date of Patent: Apr. 28, 2026

(54) PRODUCTION MANAGEMENT SYSTEM AND NON-TRANSITORY STORAGE MEDIUM STORING PRODUCTION MANAGEMENT PROGRAM

(71) Applicant: ANRITSU CORPORATION, Kanagawa (JP)

(72) Inventors: Koji Koizumi, Kanagawa (JP); Jyunki Kawamata, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 362 days.

(21) Appl. No.: 17/807,253

(22) Filed: Jun. 16, 2022

(65) Prior Publication Data

US 2022/0413470 A1 Dec. 29, 2022

(30) Foreign Application Priority Data

| Jun. 24, 2021 | (JP) | ................................. | 2021-104780 |
| Jul. 21, 2021 | (JP) | ................................. | 2021-120264 |

(51) Int. Cl.
*G05B 19/418* (2006.01)

(52) U.S. Cl.
CPC ..... *G05B 19/4184* (2013.01); *G05B 19/4183* (2013.01)

(58) Field of Classification Search
CPC . G01N 33/12; G05B 19/4183; G05B 19/4184
See application file for complete search history.

(56) References Cited

U.S. PATENT DOCUMENTS

| 5,296,655 A | * | 3/1994 | Sargent | ................ | G01G 23/163 |
| | | | | | 177/199 |
| 6,228,458 B1 | * | 5/2001 | Pinchen | ................ | B32B 27/304 |
| | | | | | 206/245 |

(Continued)

FOREIGN PATENT DOCUMENTS

| JP | 2008-112209 A | 5/2008 |
| JP | 2018-017538 A | 2/2018 |
| JP | 2019-147580 A | 9/2019 |

OTHER PUBLICATIONS

Rockwell Automation Library of Process Objects: Common Alarm Block (P_Alarm), Jun. 2016, PlantPx, https://literature.rockwellautomation.com/idc/groups/literature/documents/rm/syslib-rm002_-en-e.pdf (Year: 2016).*

(Continued)

*Primary Examiner* — Tameem D Siddiquee
(74) *Attorney, Agent, or Firm* — McDonald Hopkins LLC

(57) ABSTRACT

A production management system is capable of detecting an abnormal tendency in a production line device forming a production line and finding out a trouble of the production line device at an early stage. The production management system includes a weighing device and a packaging device which are production line devices, an inspection device, and a host computer. The production line devices, the inspection device, and the host computer are configured to communicate with each other via a network. The inspection device transmits inspection result information in the own device to the host computer. The weighing device and the packaging device transmit processing result information in the own devices to the host computer. The host computer detects the abnormal tendency of the production line device based on the inspection result information and/or the processing result information and outputs an alarm.

20 Claims, 4 Drawing Sheets

| | Production number | Non-defective number | Defective number | Average value (g) | Standard deviation (g) | Loss number |
|---|---|---|---|---|---|---|
| Weighing device | 1234pieces | 1234pieces | 0pieces | 105.5g | 0.543g | |
| Packaging device | 1234pieces | 1210pieces | 24pieces | - | ~ | 0pieces |
| Inspection device | 1123pieces | 1001pieces | 122pieces | 110.0g | 8.456g | 111pieces |

(56)                    References Cited

U.S. PATENT DOCUMENTS

| | | | |
|---|---|---|---|
| 2003/0150908 A1* | 8/2003 | Pokorny | G05B 13/0285 |
| | | | 235/375 |
| 2007/0138067 A1* | 6/2007 | Georgitsis | G01G 17/00 |
| | | | 209/552 |
| 2016/0185065 A1* | 6/2016 | Sytema | B65B 5/024 |
| | | | 493/183 |
| 2018/0314867 A1* | 11/2018 | Kotula | G06K 7/1413 |
| 2020/0156915 A1* | 5/2020 | Hofmann | G05B 19/409 |

OTHER PUBLICATIONS

Afshn Ashofteh, Data Gathering Methods in Manufacturing, Apr. 2024, Linkedin, Data Gathering Methods in Manufacturing (Year: 2024).*
Hi-Speed Checkweigher Company, Principles of Checkweighing, 1997 (Year: 1997).*

\* cited by examiner

|  | Production number | Non-defective number | Defective number | Average value (g) | Standard deviation (g) | Loss number |
|---|---|---|---|---|---|---|
| Weighing device | 1234pieces | 1234pieces | 0pieces | 105.5g | 0.543g |  |
| Packaging device | 1234pieces | 1210pieces | 24pieces | - | - | 0pieces |
| Inspection device | 1123pieces | 1001pieces | 122pieces | 110.0g | 8.456g | 111pieces |

FIG. 2

| Production progress | | | |
|---|---|---|---|
| Raw material | 5,200 kg | | |
| Planned production number | 48,000 pieces | | |
| Weighting production number | 45,678 pieces | Raw material loss | 457 kg |
| Total mass | 5,024 kg | Before weighing | 176 kg |
| Packaging production number | 45,678 pieces | Before inspection | 80 kg |
| Used packaging material amount | 9,236 m | Inspected product | 201 kg |
| Number of non-defective products | 43,123 pieces | Packaging material loss | 611 m |
| Total mass of non-defective products | 4,743 kg | Before packaging | 100 m |
| Number of defective products | 1,827 pieces | Before inspection | 146 m |
| Total mass of defective products | 201 kg | Inspected product | 365 m |
| Profit margin | 25 % | | |

FIG. 3

PRODUCTION MANAGEMENT SYSTEM AND NON-TRANSITORY STORAGE MEDIUM STORING PRODUCTION MANAGEMENT PROGRAM

TECHNICAL FIELD

The present invention relates to a production management system that manages a production status on a production line for producing, for example, meat, fish, processed foods, pharmaceuticals, and the like.

BACKGROUND ART

In a production line for producing, for example, meat, fish, processed foods, pharmaceuticals, and the like, the manufactured commodities are weighed, packaged at a predetermined weight, inspected for the presence of foreign matters, and finally inspected for the weight. The commodities determined to be non-defective by the above inspections are packed in boxes and shipped as final products.

Patent Document 1 discloses a production line including a plurality of production line devices such as a weighing machine, a packaging machine, a product inspection machine, or a boxing machine.

In such a production line, in a case where an abnormality has occurred in a sensor or the like of each device, an operator of the production line is notified of the abnormality.

RELATED ART DOCUMENT

Patent Document

[Patent Document 1] JP-A-2019-147580

DISCLOSURE OF THE INVENTION

Problem that the Invention is to Solve

However, in a case where a plurality of production line devices operate in cooperation, it is difficult to detect an occurrence of an abnormal tendency, that is, a state where any of the devices does not reach an abnormal state in which an error, an alarm, or the like occurs, but the abnormal state is about to occur.

Therefore, an object of the present invention is to provide a production management system capable of detecting an abnormal tendency in a production line device forming a production line and finding out a trouble in the production line device at an early stage.

Means for Solving the Problem

According to a first aspect of the present invention, a production management system manages a production line for producing a commodity. The production management system includes a production line device, an inspection device that constitutes the production line together with the production line device and is located at a subsequent stage of the production line device, and a host computer configured to communicate with the production line device and the inspection device. The inspection device transmits inspection result information which is information regarding an inspection result in the inspection device, to the host computer. The production line device transmits processing result information which is information regarding a processing result in the production line device, to the host computer. In a case where the inspection result information and/or the processing result information satisfies a predetermined condition, the host computer determines that the production line device has an abnormal tendency and outputs an alarm.

With this configuration, an alarm is output when the abnormal tendency of the production line device is detected based on the inspection result information and/or the processing result information. Therefore, it is possible to detect the abnormal tendency of the production line device and find out a trouble of the production line device at an early stage.

According to a second aspect of the present invention, in the production management system in the first aspect of the present invention, in a case where one production line device is a weighing device that weighs the product, and a defect in a weight of the product in the inspection result information is biased to a heavier side or a lighter side, the host computer determines that the weighing device has an abnormal tendency.

With this configuration, in a case where the defect in the weight of the product in the inspection result information is biased to the heavier side or the lighter side, it is determined that the weighing device being the production line device that weighs the product has the abnormal tendency. Therefore, it is possible to detect the abnormal tendency of the production line device and find out a trouble of the production line device at an early stage.

According to a third aspect of the present invention, in the production management system in the first aspect of the present invention, when the production line device includes a weighing device that weighs the product and a packaging device that packages the product, a standard deviation of a weight of the product in the inspection result information is larger than a predetermined value, and a weight in the processing result information from the weighing device is within a predetermined range near a target weight, the host computer determines that the packaging device has an abnormal tendency.

With this configuration, when the standard deviation of the weight of the product in the inspection result information is larger than the predetermined value, and the weight in the processing result information of the weighing device which is the production line device that weighs the weight of the product is within the predetermined range near the target weight, it is determined that the packaging device being the production line device that packages the product has an abnormal tendency. Therefore, it is possible to detect the abnormal tendency of the production line device and find out a trouble of the production line device at an early stage.

According to a fourth aspect of the present invention, a production management system manages a production line for producing a commodity. The production management system includes a production line device constituting the production line and a host computer configured to communicate with the production line device. One production line device is a packaging device. The packaging device transmits, to the host computer, information on a decrease tendency in a heater temperature and/or pressure of the packaging device, as processing result information, and transmits information on a product processed in a period in which the decrease tendency has occurred, to a rejection device located at a subsequent stage of the packaging device so that the product is to be discharged to an outside of the production line. In a case where the host computer detects the abnormal tendency of the packaging device based on the processing result information, the host computer outputs an alarm.

With this configuration, the alarm is output when the abnormal tendency of the packaging device is detected based on the processing result information. Therefore, it is possible to detect an abnormal tendency in the packaging device and find out a trouble in the packaging device at an early stage. Furthermore, it is possible to efficiently discharge a latent defective product to the outside of the production line.

According to a fifth aspect of the present invention, the production management system in the first aspect of the present invention further includes a display device. In a case where the host computer determines that the production line device has the abnormal tendency, the host computer displays, on the display device, that the production line device has the abnormal tendency.

With this configuration, in a case where the host computer determines that a predetermined production line device has an abnormal tendency, the host computer displays, on the display device, that the production line device has the abnormal tendency. Therefore, it is possible to easily recognize that a predetermined production line device is in an abnormal state.

According to a sixth aspect of the present invention, the production management system in the second aspect of the present invention further includes a display device. In a case where the host computer determines that the production line device has the abnormal tendency, the host computer displays, on the display device, that the production line device has the abnormal tendency.

With this configuration, in a case where the host computer determines that a predetermined production line device has an abnormal tendency, the host computer displays, on the display device, that the production line device has the abnormal tendency. Therefore, it is possible to easily recognize that a predetermined production line device is in an abnormal state.

According to a seventh aspect of the present invention, the production management system in the third aspect of the present invention further includes a display device. In a case where the host computer determines that the production line device has the abnormal tendency, the host computer displays, on the display device, that the production line device has the abnormal tendency.

With this configuration, in a case where the host computer determines that a predetermined production line device has an abnormal tendency, the host computer displays, on the display device, that the production line device has the abnormal tendency. Therefore, it is possible to easily recognize that a predetermined production line device is in an abnormal state.

According to an eighth aspect of the present invention, the production management system in the fourth aspect of the present invention further includes a display device. In a case where the host computer determines that the production line device has the abnormal tendency, the host computer displays, on the display device, that the production line device has the abnormal tendency.

With this configuration, in a case where the host computer determines that a predetermined production line device has an abnormal tendency, the host computer displays, on the display device, that the production line device has the abnormal tendency. Therefore, it is possible to easily recognize that a predetermined production line device is in an abnormal state.

According to a ninth aspect of the present invention, in the production management system in the first aspect of the present invention, the host computer outputs a loss occurrence status on the production line based on device result information including the received processing result information and/or inspection result information.

With this configuration, the loss occurrence status on the production line is output based on the device result information from each device. Therefore, it is possible to grasp where the loss occurs on the production line, in addition to detection of the abnormal tendency of the production line device.

According to a tenth aspect of the present invention, in the production management system in the ninth aspect of the present invention, the production line device and/or the inspection device transmits, to the host computer, information indicating the number of products processed by the production line device and/or the inspection device as the device result information. The host computer calculates, based on the received device result information, the number of product losses between a plurality of the production line devices or the number of product losses between the production line device and the inspection device, and outputs the calculated number of product losses.

With this configuration, the number of product losses between the production line devices or between the production line device and the inspection device is calculated and output based on the number of processed products in the device result information from each device. Therefore, it is possible to grasp where the loss occurs on the production line, in addition to detection of the abnormal tendency of the production line device.

According to an eleventh aspect of the present invention, in the production management system in the tenth aspect of the present invention, in a case where the number of product losses exceeds a predetermined threshold value, the host computer outputs an alarm.

Therefore, it is possible to recognize a situation where the loss exceeds the threshold value at an early stage, in addition to detection of the abnormal tendency of the production line device.

According to a twelfth aspect of the present invention, the production management system in the ninth aspect of the present invention further includes a display device. The host computer displays a loss occurrence status on the production line, on the display device.

With this configuration, the host computer displays the loss occurrence status on the production line, on the display device. Therefore, it is possible to easily recognize a loss occurrence status in each device in addition to detection of the abnormal tendency of the production line device.

According to a thirteenth aspect of the present invention, the production management system in the eleventh aspect of the present invention further includes a display device. The host computer displays a message as the alarm on the display device.

With this configuration, the host computer displays the message as the alarm on the display device. Therefore, it is possible to easily recognize that the loss exceeds a predetermined threshold value, in addition to detection of the abnormal tendency of the production line device.

According to a fourteenth aspect of the present invention, there is provided a non-transitory storage medium storing a production management program of a production management system including a production line for producing a commodity, a production line device, an inspection device that constitutes the production line together with the production line device and is located at a subsequent stage of the production line device, and a host computer configured to communicate with the production line device and the inspection device, in which the inspection device transmits inspection result information which is information regarding an inspection result in the inspection device, to the host computer, and the production line device transmits processing result information which is information regarding a processing result in the production line device, to the host computer. The storage medium stores the production management program causing the host computer to realize functions of determining that the production line device has an abnormal tendency in a case where the inspection result information and/or the processing result information satisfies a predetermined condition, and outputting an alarm.

With this configuration, an alarm is output when the abnormal tendency of the production line device is detected based on the inspection result information and/or the processing result information. Therefore, it is possible to detect the abnormal tendency in the production line device and find out a trouble of the production line device at an early stage.

According to a fifteenth aspect of the present invention, there is provided a non-transitory storage medium storing a production management program of a production management system including a production line for producing a commodity, a production line device constituting the production line, and a host computer configured to communicate with the production line device, in which one production line device is a packaging device, the packaging device transmits, to the host computer, information of a decrease tendency in a heater temperature and/or pressure of the own device, as processing result information, and transmit information of a product processed in a period in which the decrease tendency has occurred, to a rejection device located at a subsequent stage of the own device so that the product is to be discharged to an outside of the production line. The storage medium stores the production management program causing the host computer to realize a function of outputting an alarm in a case where the host computer detects the abnormal tendency of the packaging device based on the processing result information.

With this configuration, the alarm is output when the abnormal tendency of the packaging device is detected based on the processing result information. Therefore, it is possible to detect an abnormal tendency in the packaging device and find out a trouble in the packaging device at an early stage. Furthermore, it is possible to efficiently discharge a latent defective product to the outside of the production line.

Advantage of the Invention

According to the present invention, it is possible to provide a production management system capable of detecting an abnormal tendency in a production line device forming a production line and finding out a trouble in the production line device at an early stage.

BRIEF DESCRIPTION OF THE DRAWINGS

FIG. 2 is a diagram illustrating a display example of an operating status of the production management system according to the embodiment of the present invention.

FIG. 3 is a diagram illustrating an output example of production progress by a host computer in a production management system according to a modification example of the present invention.

BEST MODE FOR CARRYING OUT THE INVENTION

Hereinafter, a production management system according to an embodiment of the present invention will be described in detail with reference to the drawings.

Figure 1:
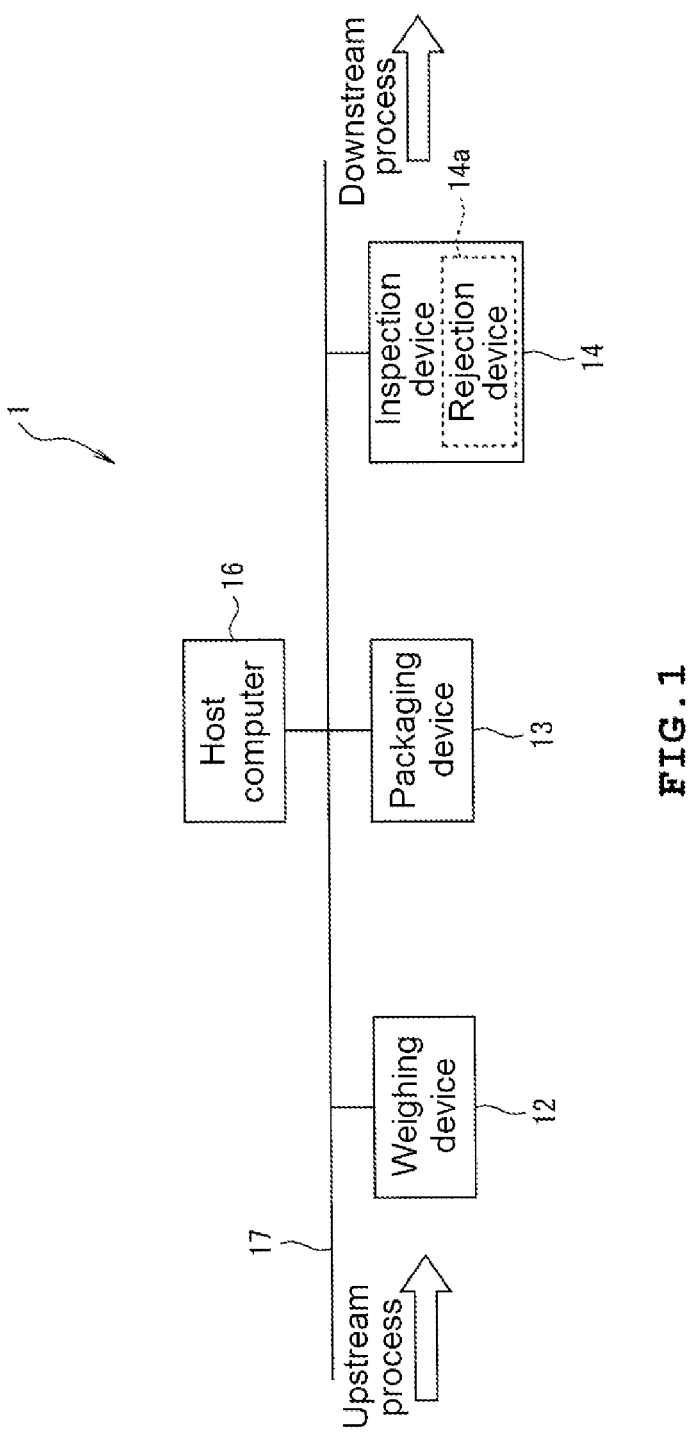
FIG. 1 is a schematic configuration diagram of a production management system according to an embodiment of the present invention.

In FIG. 1, a production management system 1 according to an embodiment of the present invention manages a production line of receiving raw materials such as foods and drinks manufactured and processed in an upstream manufacturing process, packaging the raw materials together in a predetermined weight in a weighing process and a packaging process to obtain a product, and inspecting the weight of the packaged product, the presence of foreign matters, a packaging state, and the like in an inspection process.

The production line is configured to include a weighing device 12, a packaging device 13, and an inspection device 14, each of which performs different processing. The weighing device 12 and the packaging device 13 are also referred to as production line devices. Usually, the devices (12 to 14) have a form of being arranged and lined up in a series. Transport means such as a belt conveyor is disposed between the front and rear processes in the production line and between the devices in each process.

The present embodiment is not limited to a case where the devices (12 to 14) are arranged to be adjacent to each other as illustrated in FIG. 1. For example, there may be provided a case where the weighing device 12 and the packaging device 13 are disposed to be adjacent to each other in a raw material area for handling the raw material before packaging, the inspection device 14 is disposed to be adjacent to a product area for handling the packaged product, and the divided both areas are joined to each other by transport means including a belt conveyor or a chute.

The weighing device 12 collects or combines the supplied raw materials to have a predetermined weight, and discharges the resultant to the packaging device 13.

The weighing device 12 may include combined weighing means for temporarily storing the received raw material in a storage container, putting the raw material into a plurality of weighing containers by a predetermined amount to be dispersed, combining and calculating the weighed values obtained in each weighing container, and discharging the raw material in a predetermined weight range.

The packaging device 13 packages the raw material of a predetermined weight discharged from the weighing device 12 with a packaging material and discharges the resultant to the inspection device 14. The packaging device 13 can detect, for example, the amount of packaging material used from the start of an operation of the production line to the present.

The inspection device 14 inspects the weight, the presence of foreign matters, and the like of the packaged product discharged from the packaging device 13, and discharges the packaged product determined to be non-defective in the inspection to the subsequent process.

The host computer 16 is configured by a computer unit including a central processing unit (CPU) (not illustrated), a random access memory (RAM), a read only memory (ROM), a hard disk device, and an input/output port.

The weighing device 12, the packaging device 13, the inspection device 14, and the host computer 16 are connected to a network 17. The weighing device 12, the packaging device 13, the inspection device 14, and the host computer 16 can communicate with each other via the network 17.

The arrangement of each device on the production line is preset in the host computer 16, and information regarding other devices arranged in front and rear of one device is stored in association with, for example, an ID unique to the device.

In the example illustrated in FIG. 1, the weighing device 12 in the weighing process, the packaging device 13 in the packaging process, and the inspection device 14 in the inspection process are arranged in this order. Such an arrangement is stored in the host computer 16.

In a case where there is a plurality of devices in a certain process, and each of the devices can communicate with the host computer 16, it may be possible to set whether the devices are arranged in series or in parallel.

The host computer 16 receives inspection information such as processing results, inspection results, and operation histories transmitted from each device on the production line via the network 17, and stores and manages the inspection information in the hard disk device.

The operation history of the device referred to here is not limited to start and stop of the operation of each device. For example, detection of the stored amount of the supplied raw material in the weighing device 12, zero set processing of weighing means (not illustrated), and the like are included. Waiting for the temperature stabilization of a heat seal portion, replacement of a sheet roll of the packaging material, and the like in the packaging device 13 are included. Operation information unique to each device, such as detection of carrying-in of commodities in the inspection device 14, an output of inspection results, and reset processing and a stabilization waiting period of inspection means (not illustrated) is included. Such the operation history is transmitted as inspection information to the host computer 16.

An ID unique to the device is assigned to the inspection information, and the ID may be used as identification information for identifying which the inspection information has been transmitted from which device on the data.

Further, the host computer 16 may include reception time-point information adding means for, if receiving the inspection information transmitted from each device, adding the received time-point information as a time stamp. Thus, even in a case where the inspection information of any device does not include the time-point information, the time-point information at almost the same time point is recorded in the host computer 16, and thus it is possible to avoid the limit on the functions of control software on the device side. Further, even if there is a deviation in the time point set for each device, the influence is small.

The weighing device 12 and the packaging device 13 transmit processing result information which is information regarding the processing result of each device, to the host computer 16.

The weighing device 12 receives and weighs the raw materials supplied from a supply device (not illustrated) at the previous stage, collects or combines the raw materials to be within a predetermined weight range, and transmits a time point of discharge and the combined weight to the host computer 16 as a combination discharge result.

As a result of packaging, the packaging device 13 transmits packaging OK (pointing to a normally packaged state) or packaging NG (pointing to a state of being not normally packaged), a time point at which the packaging is completed, and the like, to the host computer 16 as a packaging result.

The inspection device 14 transmits inspection result information which is information regarding an inspection result, to the host computer 16.

The inspection device 14 transmits inspection OK or inspection NG as a result of inspecting the product, a time point at which an inspection is completed, the weight in an inspection result, and the like, to the host computer 16 as the inspection result. The inspection device 14 may include a rejection device 14a that discharges the product of the inspection NG and the product receiving the packaging NG from the packaging device 13 out of the production line. Thus, it is possible to discharge only the normal product to the subsequent process with high efficiency.

In the present embodiment, the host computer 16 detects "the device that is not in an abnormal state, but is in an abnormal tendency which is a state close to the abnormal state", based on the processing result information and the inspection result information received from each device. Then, the host computer 16 outputs an alarm. The alarm is output as a message to, for example, a display device (not illustrated) connected to the host computer 16.

For example, in a case where the number of pieces of processing differs between adjacent devices, the host computer 16 determines that the product has not been correctly transported between the devices.

The host computer 16 normally monitors the inspection result in the inspection device 14. For example, in a case where the inspection result of the weight in the inspection device 14 tends to be heavy, that is, the raw material yield has not reached generation of a defective product, but has been deteriorated, or in a case where the weight tends to be light, that is, the defective product has not been generated but a lightweight NG product may be generated, the host computer 16 determines that weighing of the weighing device has an abnormal tendency. The determination may be performed under a condition that the weighing result of the weighing device 12 is a stable discharge near the target weight.

When there is a difference between the weighing result of the weighing device 12 and the inspection result of the inspection device 14, and the weighing result of the weighing device 12 is close to the target weight, the host computer can recognize that the scale of the weighing device 12 is in an abnormal tendency.

For example, in a case where the value of the inspection result in the inspection device 14 has a large bias, the host computer 16 determines that the packaging in the packaging device 13 has an abnormal tendency. The determination may be performed under a condition that the weighing result of the weighing device 12 is a stable discharge near the target weight.

When the standard deviation of the weight detected by the inspection device 14 is larger than a predetermined value, and the weighing result of the weighing device 12 is within a predetermined range near the target weight, the host computer can recognize that the packaging device 13 has an abnormal tendency such as biting in the packaging device 13 or clogging in a forming part.

In addition, by monitoring the tendency of a decrease in a heater temperature and/or pressure of the packaging device 13, it is possible to discharge the products which have been barely non-defective in a period in which such a tendency has occurred, to the outside of the production line by the rejection device 14a in the inspection device 14 at the subsequent stage. In addition, it is possible to prevent flowing-out of the so-called latent defective product. In this case, the packaging device 13 notifies the inspection device 14 of information on the product to be discharged to the outside of the production line. Tendency monitoring information is transmitted from the packaging device 13 to the host computer 16 as the processing result information, and the host computer 16 outputs an alarm. The rejection device 14*a* is not limited to being provided in the inspection device 14, and may be provided independently from the inspection device 14. Even in a production line device other than the packaging device 13, decrease tendency information on predetermined performance of the own device may be transmitted to the host computer 16 and the rejection device 14*a*, and the similar processing may be performed.

The host computer 16 can display, for example, the current operating status, on a display device.

For example, as illustrated in FIG. 2, the host computer 16 displays the production number, the non-defective number, the defective number, an average value, the standard deviation, and the loss number from the start of production in each device.

The production number is the number of times of being processed by each device. The non-defective number is the number of products determined to be non-defective during processing of each device. The defective number is the number of products determined to be a defective product during processing of each device.

The average value is the average value of the weights weighed by the weighing device 12 and the inspection device 14. The standard deviation is the standard deviation of the weight obtained by weighing of the weighing device 12 and the inspection device 14. The loss number is a value obtained by subtracting the production number in the device from the production number in the adjacent device in the previous stage.

For example, when a difference between the average value of the weighing device 12 and the average value of the inspection device 14 is equal to or more than a predetermined threshold value and the average value of the weighing device 12 is less than the average value of the inspection device 14, the host computer 16 displays a message indicating that "the scale value of the weighing device tends to be negative. Please check the scale".

For example, when the standard deviation of the inspection device 14 is equal to or more than a predetermined threshold value, the host computer 16 displays a message indicating that "there is a probability that it is not possible to correctly package weighed items may due to clogging of the forming part in the packaging device. Please check the forming part".

For example, when the loss number of the inspection device 14 is equal to or more than a predetermined threshold value, the host computer 16 displays a message indicating that "it is not possible to correctly transport the product between the packaging device and the inspection device. Please check the transport route".

As described above, in the above-described embodiment, the host computer 16 outputs an alarm in a case where the host computer 16 detects an abnormal tendency of the weighing device 12 or the packaging device 13 based on the inspection result information.

As a result, when an abnormal tendency of the weighing device 12 or the packaging device 13 is detected based on the inspection result information, an alarm is output. Therefore, it is possible to detect an abnormal tendency in the weighing device 12 or the packaging device 13 and find out a trouble in the device at an early stage.

The host computer 16 outputs an alarm in a case where the host computer 16 detects an abnormal tendency of the weighing device 12 or the packaging device 13 based on the inspection result information and the processing result information.

As a result, when an abnormal tendency of the weighing device 12 or the packaging device 13 is detected based on the inspection result information and the processing result information, an alarm is output. Therefore, it is possible to detect an abnormal tendency in the weighing device 12 or the packaging device 13 and find out a trouble in the device at an early stage.

Further, in a case where, regarding the defect in the weight of the product in the inspection result information, there is a tendency of having a defect due to a heavy weight or a tendency of having a defect due to a light weight, the host computer 16 determines that the weighing device 12 has an abnormal tendency.

As a result, it is possible to detect the abnormal tendency of the weighing device 12 based on the inspection result information, and find out the trouble of the device at an early stage.

When the standard deviation of the weight of the product in the inspection result information is larger than a predetermined value, and the weight in the processing result information of the weighing device 12 is within a predetermined range near the target weight, the host computer 16 determines that the packaging device 13 has an abnormal tendency.

As a result, it is possible to detect the abnormal tendency of the packaging device 13 based on the inspection result information and the processing result information, and find out the trouble of the device at an early stage.

The packaging device 13 transmits information on the decrease tendency in the heater temperature and/or pressure of the own device to the host computer 16 as the processing result information, and also transmits information on the product processed in a period where the tendency in the decrease occurs, to the rejection device 14*a* at the subsequent stage of the own device so as to discharge the product to the outside of the production line. In a case where the host computer 16 detects the abnormal tendency of the packaging device 13 based on the processing result information, the host computer 16 outputs an alarm.

As a result, it is possible to detect an abnormal tendency in the packaging device 13 and find out a trouble in the packaging device 13 at an early stage. Furthermore, it is possible to efficiently discharge a so-called latent defective product to the outside of the production line.

[Modification Example]

A production management system according to a modification example of the present invention will be described below. Such a production management system is obtained by using the processing result information output by the production line device and the inspection result information output by the inspection device and adding a function of being capable of grasping where a loss has occurred on the production line, which could not be grasped in the past.

In FIG. 1, a production management system 1 according to the modification example of the present invention manages a production line of receiving raw materials such as foods and drinks manufactured and processed in an upstream manufacturing process, packaging the raw materials together in a predetermined weight in a weighing process and a packaging process to obtain a product, and inspecting the weight of the product, the presence of foreign matters, a packaging state, and the like in an inspection process.

The production line is configured to include a weighing device 12, a packaging device 13, and an inspection device 14, each of which performs different processing. Usually, the devices are arranged in a form of being lined up in a series, and transport means such as a belt conveyor is disposed between the processes in front and rear of the production line and between the devices of the respective processes. The weighing device 12 and the packaging device 13 are also referred to as the production line device.

The present embodiment is not limited to a case where the devices (12 to 14) are arranged to be adjacent to each other as illustrated in FIG. 1. For example, there may be provided a case where the devices from a raw material supply device (not illustrated) to the packaging device 13 are disposed to be adjacent to each other in a raw material area for handling the raw material before packaging, the inspection device 14 and a caser (not illustrated) are disposed to be adjacent to a product area for handling the packaged product, and the divided both areas are joined to each other by the transport means including a belt conveyor or a chute.

The weighing device 12 collects or combines the supplied raw materials to have a predetermined weight, and discharges the resultant to the packaging device 13.

The weighing device 12 may include combined weighing means for temporarily storing the received raw material in a storage container, putting the raw material into a plurality of weighing containers by a predetermined amount to be dispersed, combining and calculating the weighed values obtained in each weighing container, and discharging the raw material in a predetermined weight range.

The packaging device 13 packages the raw material of a predetermined weight discharged from the weighing device 12 with a packaging material and discharges the resultant to the inspection device 14. The packaging device 13 can detect, for example, the amount of packaging material used from the start of an operation of the production line to the present.

The inspection device 14 inspects the weight, the presence of foreign matters, and the like of the packaged product discharged from the packaging device 13, and discharges the packaged product determined to be non-defective in the inspection.

The host computer 16 is configured by a computer unit including a central processing unit (CPU) (not illustrated), a random access memory (RAM), a read only memory (ROM), a hard disk device, and an input/output port.

The weighing device 12, the packaging device 13, the inspection device 14, and the host computer 16 are connected to a network 17. The weighing device 12, the packaging device 13, the inspection device 14, and the host computer 16 can communicate with each other via the network 17.

In the host computer 16, the arrangement of each device on the production line is preset, and information regarding other devices disposed in front and rear of one device is stored in association with, for example, an ID unique to the device.

In the example illustrated in FIG. 1, the weighing device 12 in the weighing process, the packaging device 13 in the packaging process, and the inspection device 14 in the inspection process are arranged in this order. Such an arrangement is stored in the host computer 16.

In a case where there is a plurality of devices in a certain process, and each of the devices can communicate with the host computer 16, it may be possible to set whether the devices are arranged in series or in parallel.

The host computer 16 receives inspection information such as inspection results and operation histories transmitted from each device on the production line via the network 17, and stores and manages the inspection information in the hard disk device.

The operation history of the device referred to here is not limited to start and stop of the operation of each device. For example, detection of excess or deficiency in supply amounts of raw materials from the upstream process in the supply device 11, detection of opening of covers, which is caused by the stop of the operation, detection of passage of the raw material discharged by the supply device, and the like are included. Detection of the stored amount of the raw material supplied in the weighing device 12, zero set processing of weighing means (not illustrated), and the like are included. Waiting for the temperature stabilization of a heat seal portion, replacement of a sheet roll of the packaging material, and the like in the packaging device 13 are included. Operation information unique to each device, such as detection of carrying-in of commodities in the inspection device 14, an output of inspection results, and reset processing and a stabilization waiting period of inspection means (not illustrated) is included. Such the operation history is transmitted as the event data to the host computer 16.

An ID unique to the device is assigned to the event data, and the ID may be used as identification information for identifying which event data has been transmitted from which device on the data.

Further, the host computer 16 may include reception time-point information adding means for, if receiving the event data transmitted from each device, adding the received time-point information as a time stamp. Thus, even in a case where the event data of any device does not include the time-point information, the time-point information at almost the same time point is recorded in the host computer 16, and thus it is possible to avoid the limit on the functions of control software on the device side. Further, even if there is a deviation in the time point set for each device, the influence is small.

The weighing device 12, the packaging device 13, and the inspection device 14 transmit device result information (referring to the processing result information and the inspection result information), which is information regarding the processing result of each device, to the host computer 16.

The weighing device 12 receives and weighs the supplied raw materials, collects or combines the raw materials to be within a predetermined weight range, and transmits a combination discharge result including a time point of discharge, the combined weight, and the like, to the host computer 16 as the processing result information.

The packaging device 13 transmits a packaging result including packaging OK (pointing to a normally packaged state) or packaging NG (pointing to a state of being not normally packaged) as a result of packaging, a time point at which the packaging is completed, and the amount of used packaging material, and the like, to the host computer 16 as the processing result information.

The inspection device 14 transmits an inspection result including inspection OK or inspection NG as a result of inspecting the product, a time point at which an inspection is completed, the weight in an inspection result, and the like, to the host computer 16 as the inspection result information.

The inspection device 14 may include a rejection device (14a) that discharges the product of the inspection NG and the product receiving the packaging NG from the packaging device 13 out of the production line. Thus, it is possible to discharge only the normal product to the caser at the subsequent stage with high efficiency.

In the present embodiment, the host computer 16 calculates a deviation status from the planned production number, the loss occurrence status of raw materials or packaging materials, and a profit margin from the purchase price of the raw materials and the packaging materials and the shipment value of volume, from the amount of raw materials and the planned production number set before the start of an operation of the production line, based on the device result information received from each device. In addition, the host computer 16 displays, for example, the calculation on a display device (not illustrated) of the host computer 16.

At this time, the host computer 16 converts the numerical value representing the amount of raw materials in the device result information received from each device into a common unit (for example, kg).

Here, the loss of raw materials and packaging materials means that the raw materials and packaging materials are consumed with defective products and are lost during the operation of the production line. This includes raw materials and packaging materials for products that have spilled during transport between the devices, raw materials and packaging materials for products determined to be defective by the inspection device 14, packaging materials that have not been used by adjustments and the like in the packaging device 13, and the like.

The host computer 16 can display a screen as illustrated in FIG. 3 on the display device as the current production progress, for example.

In FIG. 3, "raw material" is the mass of the raw material to be supplied, and "planned production number" is the number of pieces planned to be produced from the raw materials.

"Weighing production amount" is the number of pieces discharged in combination in the weighing device 12, which is calculated from the combination discharge result of the weighing device 12. "Total mass" is the sum of the masses discharged in combination in the weighing device 12, which is calculated from the combination discharge result of the weighing device 12, that is, the total mass of raw materials discharged by being actually collected or combined among the weighed values of the raw materials weighed in order to perform collection or combination in a predetermined weight range.

Usually, the predetermined weight range used in the weighing device 12 is set in units of grams (g), but "total mass" is converted into kilograms (kg).

"Packaged production number" is the number of pieces packaged and discharged by the packaging device 13, which is calculated from the packaging result of the packaging device 13. "Used packaging material amount" is the amount of packaging material used for packaging in the packaging device 13 from the start of the operation of the production line to the present, which is calculated from the packaging result of the packaging device 13.

In a case where the packaging result of the packaging device 13 does not include the amount of packaging material used for packaging, the number of packages packaged may be multiplied by the amount of packaging material per piece, or the amount of packaging material may be calculated by receiving a pulse signal corresponding to the feed amount of the packaging material from the packaging device 13 and counting the number of the pulses.

Usually, the amount of packaging material used for packaging individual products is set in millimeters (mm), but "used packaging material amount" is converted into meters (m).

"The number of non-defective products" is the number of products determined to be non-defective by the inspection device 14, which is calculated from the inspection results of the inspection device 14. "The total mass of non-defective products" is the total mass of the products determined to be non-defective by the inspection device 14, which is calculated from the inspection results of the inspection device 14, and is the total of the measured values used for the excess/deficiency inspection.

"The number of defective products" is the number of products determined to be defective by the inspection device 14, which is calculated from the inspection results of the inspection device 14. "The total mass of defective products" is the total mass of the products determined to be defective by the inspection device 14, which is calculated from the inspection results of the inspection device 14, and is the total of the measured values used for the excess/deficiency inspection.

Usually, the value used for the excess/deficiency inspection of each product is set in units of grams (g), but "total mass of non-defective products" is converted into kilograms (kg).

"Raw material loss" is the amount of raw materials lost from the start of the operation of the production line to the present, and indicates the loss occurrence status of the raw materials.

"Before weighing" is the amount of raw materials lost between a supply device 11 and the weighing device 12, and is calculated by subtracting the "total mass" from the "raw material".

"Before inspection" is the amount of raw materials lost between the packaging device 13 and the inspection device 14, and is calculated by subtracting the "total mass of non-defective products" and the "total mass of defective products" from the "total mass". That is, "before inspection" is the amount of raw materials lost during transport from the packaging device 13 to the inspection device 14.

"Inspected product" is the amount of raw materials lost in the inspection device 14, and is the value of the "total mass of defective products".

"Raw material loss" is calculated by adding all "before weighing", "before inspection", and "inspected product".

"Packaging material loss" is the amount of packaging materials lost from the start of the operation of the production line to the present, and indicates the loss occurrence status of the packaging materials.

"Inspected product" is the amount of packaging materials lost in the inspection device 14 and is obtained by multiplying the "number of defective products" by the amount of packaging materials used for one product, for example, 0.2 m.

"Before inspection" is the amount of packaging materials lost between the packaging device 13 and the inspection device 14, and is obtained in a manner that a value obtained by subtracting the "number of non-defective products" and "the number of defective products" from the "packaging production number" is multiplied by the amount of packaging materials used for one product. That is, "before inspection" is the amount of packaging materials lost during transport from the packaging device 13 to the inspection device 14.

"Before packaging" is the amount of packaging materials lost in the packaging device 13, and is obtained in a manner that a value obtained by multiplying "packaging production number" by the amount of packaging materials used for one product is subtracted from the "used packaging material amount".

"Packaging material loss" is calculated by adding all "before packaging", "before inspection", and "inspected product".

The "profit margin" is an approximate calculation index calculated from the assumed profit calculated based on the assumed shipment value calculated by multiplying the "number of non-defective products" by unit price information of the product set in advance, the assumed cost of used raw materials and packaging materials, and the assumed expenses corresponding to the operating hours of the production line. The assumed cost may be calculated based on a production plan or may be calculated based on the production performance in accordance with the production progress.

In addition to the illustrated "profit margin", it is possible to grasp an appropriate index such as a production progress rate, in accordance with the production progress in the weighing process, the packaging process, and the inspection process by combining information stored in the host computer 16 or being able to set an item name and an arithmetic expression so that it is possible to calculate various indices that can be calculated by using other pieces of information set and input.

As another index, for example, based on "raw material loss", the profit that could have been originally obtained from the market price of the product that could not be shipped as a product may be displayed as the loss amount. In this case, the host computer 16 is set with a loss amount per 1 kg of "raw material loss" calculated in advance based on the amount of raw materials per product and the average profit per product.

For example, when the host computer 16 calculates the current production progress and the values of "raw material loss" and "packaging material loss" exceed a predetermined threshold value or the profit margin falls below a predetermined threshold value, the host computer 16 may display a message as an alarm on the display device, or the display may be highlighted by changing the display form such as color.

Figure 4:
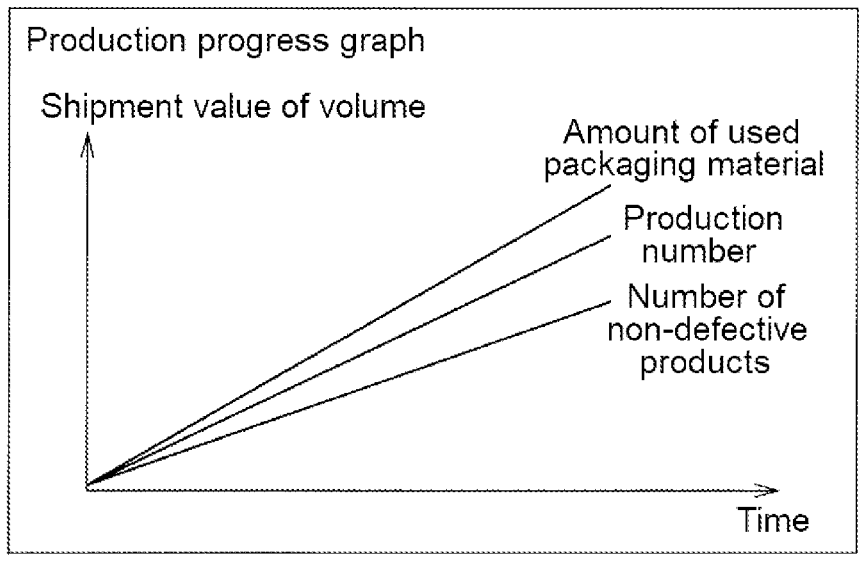
FIG. 4 is a diagram illustrating an output example of a production progress graph by the host computer in the production management system according to the modification example of the present invention.

The host computer 16 may display a screen as illustrated in FIG. 4 on the display device as a current production progress graph, for example.

In the present modification example, "raw material loss" is expressed in kilograms (kg) and "packaging material loss" is expressed in meters (m), but "raw material loss" and "packaging material loss" are converted to other quantities in accordance with the convenience in production management. For example, the packaging material loss may be converted into a value in units of "rolls" divided by the length per roll and output the converted value.

In the present modification example, even in a case where the inspection is NG in the inspection device 14 for inspection items other than the excess/deficiency inspection, it is possible to calculate the "total mass of defective products" by using the weight value measured for the excess/deficiency inspection, while in the inspection device 14, it may not be possible to measure the weight for some reason.

An example in which it is not possible to measure the weight by the inspection device 14 is an excess of a measurement range. In this case, the inspection result includes "overflow" (OVF) indicating the excess of the upper limit of the measurement range. The host computer 16 replaces the "OVF" included in the inspection result with the maximum value of the measurement range of the inspection device 14 set in advance, and then sums up the "number of defective products" and "total mass of defective products", respectively. The difference from the actual weight becomes an error, but is within an allowable range from the viewpoint of the total raw material loss.

Another example in which it is not possible to measure the weight by the inspection device 14 is a so-called two-seater. Two-seater represents a state where two products are carried in at short intervals and it is not possible to correctly measure the individual weights. Such a two-seater is not determined as inspection NG and is brought back to re-inspection. Thus, the two-seater does not correspond to either "the number of non-defective products" or "the number of defective products". In addition, since it is possible to calculate neither "total mass of non-defective products" nor "total mass of defective products", the two-seater is expressed as "raw material loss" and "packaging material loss" of "before inspection" in the item of FIG. 3.

For exceptional products that cannot be weighed by the inspection device 14 as described above, management rules defined for each production line may be set. Different processing may be performed by the host computer 16 in an identifiable range based on information which can be detected by the inspection device 14 or is included in the inspection result. Thus, it is possible to be compatible with improvement of the function of the inspection device 14.

For exceptional products generated in the weighing device 12 and the packaging device 13 in addition to the inspection device 14, management rules defined for each production line may be set, and different processing may be performed by the host computer 16 in an identifiable range. Thus, it is possible to be compatible with improvement of the functions of the weighing device 12 and the packaging device 13.

The host computer 16 can add or omit items for the output as illustrated in FIG. 3 by an operation from a keyboard or the like (not illustrated) so as to correspond to the management rules defined for each production line.

The host computer 16 can cause the output as illustrated in FIG. 3 to correspond to the arrangement of the production line or change a display form such as a color or a layout by an operation of the keyboard or the like (not illustrated) so as to highlight the item to be managed with priority.

The host computer 16 can aggregate and output progress information of a plurality of production lines on one screen. In this case, among the output items as illustrated in FIG. 3, the set specific items can be aggregated and output.

In this manner, it is possible to easily check that the amount of used packaging material has increased or that the production number and the number of non-defective products have decreased.

As described above, in the above-described modification example, the weighing device 12, the packaging device 13, and the inspection device 14 transmit the device result information including the contents set in the own device to the host computer 16. The host computer 16 outputs the loss occurrence status on the production line based on the received device result information, in addition to detection of the abnormal tendency of the production line device.

As a result, the loss occurrence status on the production line is output from the device result information from the weighing device 12, the packaging device 13, and the inspection device 14. Therefore, it is possible to grasp where the loss has occurred on the production line, and to grasp the improvement points in the loss reduction.

The weighing device 12, the packaging device 13, and the inspection device 14 transmit information indicating the number of products processed by the own device to the host computer 16 as the device result information. The host computer 16 calculates and outputs the number of product losses between the devices based on the received device result information.

As a result, the number of product losses between the devices is calculated and output based on the number of processed products in the device result information from the weighing device 12, the packaging device 13, and the inspection device 14. Therefore, it is possible to grasp where the loss has occurred on the production line, and to grasp the improvement points in the loss reduction.

The host computer 16 outputs an alarm in a case where the number of product losses exceeds the predetermined threshold value.

As a result, an alarm is output in a case where the number of product losses exceeds the predetermined threshold value. Therefore, it is possible to recognize the situation where the loss exceeds the threshold value at an early stage, and to grasp the improvement points in the loss reduction.

Hitherto, the embodiment of the present invention has been disclosed, but it is clear that changes can be made by those skilled in the art without departing from the scope of the present invention. All such modifications and equivalents are intended to be included in the claims.

DESCRIPTION OF REFERENCE NUMERALS AND SIGNS

1 Production Management System
12 Weighing Device (Production Line Device in Weighing Process)
Packaging Device (Production Line Device in Packaging Process)
14 Inspection Device (Device in Inspection Process)
14a Rejection Device (Rejector)
16 Host Computer
17 Network

What is claimed is:

1. A production management system that manages a production line for producing a commodity, the system comprising:

at least one production line device comprising a packaging device that packages supplied raw materials and discharges a product;

an inspection device that constitutes the production line together with the at least one production line device and is located at a subsequent stage of the production line device; and a host computer configured to communicate with the production line device and the inspection device, and to store an arrangement of each device in the production line, wherein the inspection device transmits inspection result information which is information regarding an inspection result in the inspection device, to the host computer, wherein the host computer is configured to determine that the production line has an abnormal tendency based on the inspection result information and the processing result information, wherein the packaging device transmits packaging result information which is information regarding a processing result in the packaging device, to the host computer, wherein in a case where a number of processed products identified in the packing result information is different between the inspection device and the packaging device, the host computer determines that a production line device between the packaging device and the inspection device has an abnormal tendency and outputs an alarm, wherein the production line comprises a weighing device that measures a weight of the raw materials and discharges the raw materials to the packaging device after combining the raw materials to have a predetermined weight, and wherein in a case where a standard deviation of a weight of the product in the inspection result information is larger than a predetermined value, and the measured weight in the processing result information from the weighing device is within a predetermined range near a target weight, the host computer determines that the packaging device has an abnormal tendency and outputs the alarm.

2. The production management system according to claim 1, wherein the production line further comprises a weighing device that measures a weight of the product and is located at a stage preceding the packaging device, and wherein in a case where a defect in the measured weight of the product is biased to a heavier side or a lighter side, the host computer determines that the weighing device has the abnormal tendency.

3. The production management system according to claim 1, wherein the packaging device transmits, to the host computer, information on a decrease tendency in a heater temperature of the packaging device, as the packaging result information, wherein the packaging device transmits, to the inspection device, information on a product processed in a period in which the decrease tendency has occurred, wherein in a case where the host computer detects the decrease tendency of the temperature of the heater as the abnormal tendency of the packaging device based on the processing result information, the host computer outputs an alarm.

4. The production management system according to claim 1, further comprising:

a display device, wherein, in a case where the host computer determines that the production line device has the abnormal tendency, the host computer displays, on the display device, that the production line device has the abnormal tendency.

5. The production management system according to claim 2, further comprising:

a display device, wherein, in a case where the host computer determines that the production line device has the abnormal tendency, the host computer displays, on the display device, that the production line device has the abnormal tendency.

6. The production management system according to claim 4, further comprising:

a display device, wherein, in a case where the host computer determines that the production line device has the abnormal tendency, the host computer displays, on the display device, that the production line device has the abnormal tendency.

7. The production management system according to claim 1, wherein the host computer outputs a loss occurrence status of packaging materials on the production line based on device result information including the received packaging result information.

8. The production management system according to claim 7, wherein the packaging device and the inspection device transmit, to the host computer, information indicating the number of products processed by each of the devices as the device result information, wherein the host computer calculates, based on the received the device result information, the number of product losses between the packaging device and the inspection device, and outputs the calculated number of product losses.

9. The production management system according to claim 8, wherein in a case where the number of product losses exceeds a predetermined threshold value, the host computer outputs an alarm.

10. The production management system according to claim 7, further comprising:

a display device, wherein the host computer displays the loss occurrence status of the packaging materials on the production line, on the display device.

11. The production management system according to claim 9, further comprising:

a display device, wherein the host computer displays a message as the alarm on the display device.

12. A production management system that manages a production line for producing a commodity, the system comprising:

at least one production line device comprising a packaging device that packages a product;

an inspection device that constitutes the production line together with the at least one production line device and is located at a subsequent stage of the production line device; and a host computer configured to communicate with the production line device and the inspection device, and to store an arrangement of each device in the production line, wherein the inspection device transmits inspection result information which is information regarding an inspection result in the inspection device, to the host computer, wherein the host computer is configured to determine that the production line has an abnormal tendency based on the inspection result information and the processing result information, wherein the packaging device transmits packaging result information which is information regarding a processing result in the packaging device, to the host computer, wherein in a case where a number of processed products identified in the packing result information is different between the inspection device and the packaging device, the host computer determines that a production line device between the packaging device and the inspection device has an abnormal tendency and outputs an alarm, wherein the packaging device transmits, to the host computer, information on a decrease tendency in a heater temperature of the packaging device, as the packaging result information, wherein the packaging device transmits, to the inspection device, information on a product processed in a period in which the decrease tendency has occurred, wherein in a case where the host computer detects the decrease tendency of the temperature of the heater as the abnormal tendency of the packaging device based on the processing result information, the host computer outputs an alarm.

13. The production management system according to claim 12, wherein the production line further comprises a weighing device that measures a weight of the product and is located at a stage preceding the packaging device, and wherein in a case where a defect in the measured weight of the product is biased to a heavier side or a lighter side, the host computer determines that the weighing device has the abnormal tendency.

14. The production management system according to claim 12, further comprising:

a display device, wherein, in a case where the host computer determines that the production line device has the abnormal tendency, the host computer displays, on the display device, that the production line device has the abnormal tendency.

15. The production management system according to claim 13, further comprising:

a display device, wherein, in a case where the host computer determines that the production line device has the abnormal tendency, the host computer displays, on the display device, that the production line device has the abnormal tendency.

16. The production management system according to claim 12, wherein the host computer outputs a loss occurrence status of packaging materials on the production line based on device result information including the received packaging result information.

17. The production management system according to claim 16, wherein the packaging device and the inspection device transmit, to the host computer, information indicating the number of products processed by each of the devices as the device result information, wherein the host computer calculates, based on the received the device result information, the number of product losses between the packaging device and the inspection device, and outputs the calculated number of product losses.

18. The production management system according to claim 17, wherein in a case where the number of product losses exceeds a predetermined threshold value, the host computer outputs an alarm.

19. The production management system according to claim 16, further comprising:

a display device, wherein the host computer displays the loss occurrence status of the packaging materials on the production line, on the display device.

20. The production management system according to claim 18, further comprising:

a display device, wherein the host computer displays a message as the
alarm on the display device.

* * * * *